United States Patent [19]
Smith

[11] 4,102,543
[45] Jul. 25, 1978

[54] BRIDGE SCORING DEVICE

[76] Inventor: Samuel C. Smith, 210 Hartman Rd., Newton Centre, Mass. 02159

[21] Appl. No.: 718,847

[22] Filed: Aug. 30, 1976

[51] Int. Cl.² .............................................. G09B 19/22
[52] U.S. Cl. ................................. 283/49; 283/66 A; 227/109
[58] Field of Search .............. 283/49, 50, 48 R, 48 A, 283/66 R, 66 A; 227/109, 107, 110, 111; 281/45

[56] References Cited

U.S. PATENT DOCUMENTS

| | | | |
|---|---|---|---|
| 592,054 | 10/1897 | James | 283/50 |
| 1,407,095 | 2/1922 | Smythe, Jr. | 283/49 |
| 1,442,266 | 1/1923 | Graham et al. | 283/66 A |
| 3,016,538 | 1/1962 | Oussani | 227/109 |

FOREIGN PATENT DOCUMENTS 194,964  12/1919  Canada .................................. 283/49

*Primary Examiner*—Stephen C. Pellegrino
*Attorney, Agent, or Firm*—Thompson, Birch, Gauthier & Samuels

[57] ABSTRACT

This invention relates to new and improved apparatus for scoring duplicate bridge. The apparatus comprises in combination a score sheet, a jacket for the score sheet which is removably attachable to a rectangular receptacle for holding the cards and known as "the board", and a score board which includes means for readily securing the score sheets thereto in shingled or overlapping relationship.

6 Claims, 3 Drawing Figures

| N-S Pair | CON-TRACT | BY | NORTH-SOUTH | | E-W Pair | Match Points |
|---|---|---|---|---|---|---|
| | | | Net Plus | Net Minus | | |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |

NO. 1 ------- BRIDGE CLUB
Publisher --  Board No.

| | | | EAST-WEST | | | |
|---|---|---|---|---|---|---|
| | | | Net Plus | Net Minus | | |
| 18 | | | | 1 | | |
| 19 | | | | 2 | | |
| 20 | | | | 3 | | |
| 21 | | | | 4 | | |
| 22 | | | | 5 | | |
| 23 | | | | 6 | | |
| 24 | | | | 7 | | |
| 25 | | | | 8 | | |
| 26 | | | | 9 | | |
| 27 | | | | 10 | | |
| 28 | | | | 11 | | |
| 29 | | | | 12 | | |
| 30 | | | | 13 | | |
| 31 | | | | 14 | | |
| 32 | | | | 15 | | |
| 33 | | | | 16 | | |
| 34 | | | | 17 | | |

AVAILABLE:

BRIDGE SCORING DEVICE

BACKGROUND OF THE INVENTION

Dupicate bridge is a card game in which several teams of two players each play, one against another, several preselected and pre-dealt hands of bridge. Each individual hand is played and scored like ordinary contract bridge. After each hand, however, both teams and cards rotate according to some established pattern so that each two-player team plays against every other two-player team and also so that each two-player team plays each of the pre-dealt hands. Final scoring in duplicate bridge is not based strictly on how well one team plays a particular hand but rather on how well the team plays in comparison to how well the other teams play the same hand.

Each of the pre-selected and pre-dealt hands is placed in a flat rectangular receptacle having pocket-like openings along each side for holding each of the four hands face down. This receptacle is ordinarily called "the board". After each game is completed, the cards are carefully returned to the board in the same order so that the board is then ready to be played by two more teams.

Another feature of duplicate bridge is that the scores of previous teams playing the same hand or board must be concealed from other teams until they have completed playing that board. Otherwise, two new teams playing the hand could adjust their bidding and playing depending on their interpretation of the performances of previous teams playing the same hand. To this end, individual score sheets have trypically been folded in some fashion to conceal the recorded scores. This leads to difficulties in handling the score sheets, loss of time, and possible exposure of scores if the sheet is not properly folded.

Still another feature of duplicate bridge is that at the conclusion of a tournament, each of the score sheets, one for each board which has been played, must be collected and the scores must be tabulated or "match-pointed" to determine the winning team. This has typically required that someone transpose the individual scores from each of the "board" score sheets to a master score sheet. This manual process is time-consuming and frequently leads to errors. It is this process which is eliminated by this invention.

The prior art is replete with score sheets and various other apparatus related to playing duplicate bridge and similar games. For example, U.S. Pat. No. 3,314,693 shows a Duplicate Bridge Scoring Aid. U.S. Pat. Nos. 835,833 and 1,792,471 show score sheets for duplicate bridge. None of these patents, however, addresses the very real problem of compiling and tabulating scores in a duplicate bridge tournament comprising many teams.

OBJECTIONS OF THE INVENTION

Accordingly, it is a primary object of this invention to provide an apparatus for scoring duplicate bridge which obviates the various problems discussed above.

It is also an object of this invention to provide a means for removably securing the score sheet to "the board" so that the sheet is not ordinarily visible.

A further object of this invention is to provide a score board with means for readily securing the score sheets thereto in shingled or overlapping relationship so as to form a composite score sheet where all of the scores are automatically tabulated or "match-pointed" without the need for a master score sheet.

These and other objects will become apparent from the following description.

DESCRIPTION OF PREFERRED EMBODIMENT

Figure 1:
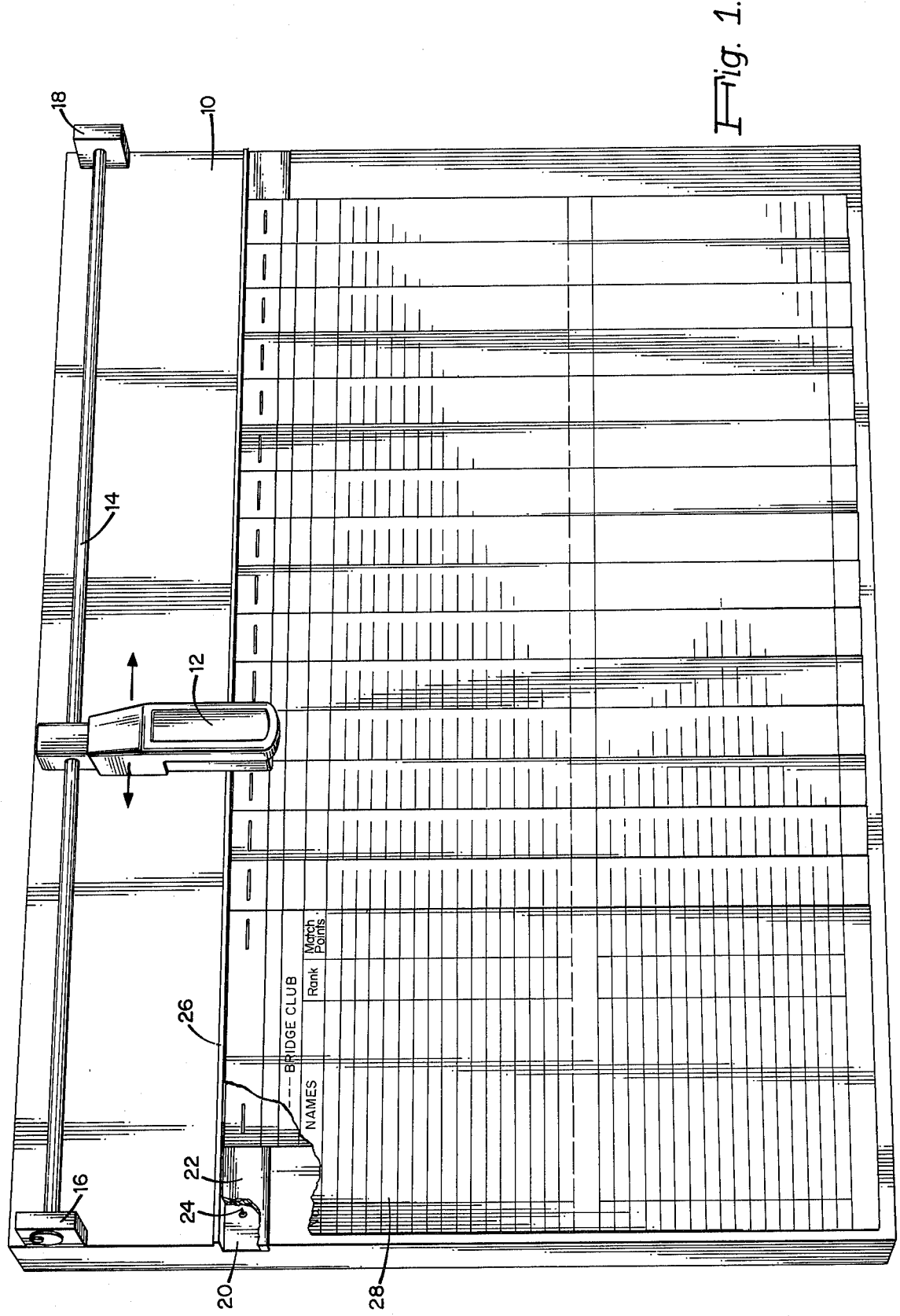
FIG. 1 is a perspective view of the score board and scoring sheets of this invention.

FIG. 1 illustrates the score board of this invention. The score board 10 comprises a substantially flat, rectangular, and solid surface. It may be fabricated of wood, plastic, fiberglass or any similarly light-weight material. The dimensions of the score board are not crucial but, preferably, the vertical dimension or height is equal to or somewhat greater than the length or vertical dimension so as to accomodate a movable fastening means such as stapling gun 12 slidably mounted on horizontal support bar 14. The support bar 14 may be either permanently fastened in place by end supports 16 and 18 or may be removably held in place by any conventional means such as slotted or flexible dimple mountings. The horizontal dimension or width is sufficient to accomodate all of the score sheets for a particular duplicate bridge match in overlapping or shingled relationship as shown.

The board also comprises a slot or notch 20 running horizontally near the top edge of the score board. The purpose of this slot is to accomodate a strip of wood 22 to which the score sheets can be affixed. Thus, by removing the strip 22 after all of the score sheets are attached, the tabulated scores can be moved for display, storage or discarding, and the board can be reused by inserting a new strip. The strip 22 is held securely in place by the use of two or more metal pins 24 along the length of slot 20. Equivalent means of holding strip 22 in place are also considered as within the scope of this invention.

Furthermore, slot 20 preferably includes a protruding upper edge 26 which serves as an alignment guide against which the tops of the score sheets are placed prior to fastening to insure correct alignment of the score sheets on the score board. This protruding upper slot edge will not unduly interfere with the staple gun provided either that support bar 14 is mounted at about an equal or slightly greater distance from the face of the score board or, alternatively, if the staple gun has a protruding head where the staples are ejected. Another variation is to slot protruding edge 26 so as to accomodate the width of the staple gun at discrete locations along slot 20. Other ways of accomplishing this will readily suggest themselves to those skilled in the art, for example using a flexible material for protruding edge 26. All of these means are considered to be within the scope of this invention. Also, whereas the preferred means for fastening the score sheets to strip 22 is a slidably mounted staple gun as illustrated because of simplicity and economy, more sophisticated means for attaching the score sheets to score board 10 will also suggest themselves to those skilled in the art and these fastening means, too, should be considered as within the scope of this invention.

Figures 2, 3:
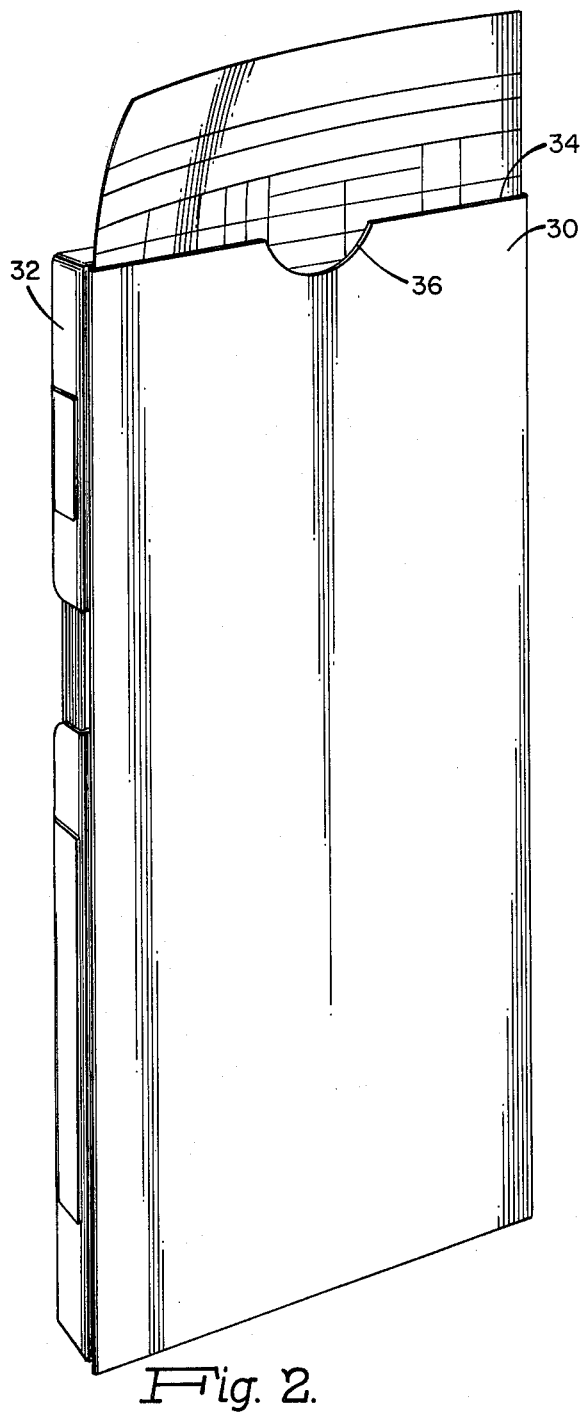
FIG. 2 is a perspective view of the card holder or "the board" illustrating the score sheet jacket fastened to the underside in accordance with this invention.
FIG. 3 illustrates a typical duplicate bridge score sheet which is suitable for use with this invention.

In FIG. 1, all but the left-most score sheet fastened to score board 10 are typical duplicate bridge score sheets as illustrated in FIG. 3. The score sheets are attached to the score board in shingled or overlapping relation such that only the right-most column of each sheet is left exposed. Also, the score sheets must be identical and the horizontal rows and vertical columns must align as shown. The left-most sheet 28 attached to score board 10 is preferably a cover-name sheet as shown to identify the various teams and players.

At the conclusion of a duplicate bridge match, all of the boards are collected and the individual score sheets removed from each jacket. The scores are then match-pointed and recorded on the right-most vertical column of each score sheet. Beginning at the right side of the score board 10, a score sheet is pushed up against the alignment guide 26 and over the wooden strip 20 with one hand and fastened thereto by the staple gun with the other hand. The second score sheet is held up to wooden strip 20, pushed up against alignment guide 26, and placed alongside the first score sheet such that only the right hand column of the first score sheet is left exposed. The stapling means is slid leftward until it is over the second score sheet, and the second score sheet is then fixed in place. In similar fashion, each score sheet is attached in overlapping relationship to the score board until all of the sheets are attached. The scores are thereby quickly, easily and accurately tabulated.

FIG. 2 illustrates a jacket for the score sheet shown in FIG. 3. The jacket essentially comprises a rectangular envelope 30 which is slightly larger than the size of the score sheet and either the same size or slightly smaller than the "board" 32. The jacket 30 has a slit 34 along one edge for inserting or removing the score sheet. The jacket may be constructed out of any inexpensive and light weight material, typically heavy paper, cardboard or plastic. It is preferred that the slit edge 34 include an approximately finger-sized cut-out center section 36. The purpose of the cut-out section, as will readily be seen, is to faclitate removing the score sheet from inside the jacket when a hand of bridge has been completed and a score is to be recorded. A further feature of the jacket is the provision of an adhesive surface (not shown) along the underside of the jacket for removably securing the jacket to one face of the "board". This may be readily accomplished, for example, with doublefaced tape. However, this invention is meant to encompass any comparable methods of securing the jacket to the "board", such as any of the new self-adhering surfaces.

FIG. 3 illustrates a score sheet comprising horizontal rows and vertical columns which is particularly suitable for this invention. One such score sheet is employed for each "board" which is played. The score sheet shown can be employed in a duplicate bridge tournament having up to 34 teams (i.e., 68 individuals playing. It will be apparent to one skilled in the art that similar score sheets could be prepared to accomodate any number of teams either fewer or greater than 34. Most of the features of this score sheet are self-explanatory in FIG. 3 to those skilled in the art. There are, however, three important features of this score sheet which merit further discussion. The principal feature of the score sheet is that the right-most vertical column records the final or "match-pointed" score for each pair of teams which plays the "board" represented by that score sheet.

Another important feature of the score sheet is that each column be substantially vertical, that each row be substantially horizontal, and that the location of the columns and rows be substantially identical from sheet to sheet. While it is preferred that the horizontal rows on the score sheet be of a substantially uniform width, it will be seen that this is not a requirement as long as the width of each row is uniform from sheet to sheet.

An optional third feature of the score sheet is a horizontal perforation located midway between the top and the bottom of the score sheet. In some instances it will be found convenient at the conclusion of the bridge tournament to separate the top and bottom halves for taulation purposes. For this embodiment of the score sheet, therefore, it is preferred that the top and bottom halves of each sheet have the same type of substantial correspondence as previously described for any two sheets.

Having described my invention, what I now claim is:

1. An apparatus for scoring duplicate bridge comprising in combination:
    (a) a plurality of identical score sheets each one having horizontal rows and vertical columns for recording the scores of each team with respect to a particular bridge hand, said rows and columns being so designed that the final score for each team with respect to that hand appears in the right-most vertical column of each sheet;
    (b) a jacket for each said score sheet comprising an opaque rectangular paper, cardboard or plastic envelope just large enough to contain one of said score sheets in non-folded position and having a slit along one edge thereof for inserting or removing a score sheet;
    (c) a substantially flat, rectangular, and generally-vertically positioned score board; and,
    (d) means for fastening to aid score board a plurality of said score sheets in horizontally-aligned vertical overlapping relationship so as to expose only the right-most vertical column of each sheet, said means compising a horizontal support located along the vertically uppermost edge of said score board and a staple gun slidably mounted on said support.

2. The apparatus of claim 1 wherein each of said score sheets is horizontally perforated.

3. The apparatus of claim 1 wherein each said jacket includes an adhesive surface along one face of the envelope for readily-removably securing it to another surface.

4. The apparatus of claim 1 wherein said score board includes a horizontal channel located beneath the head of said staple gun so as to removably accommodate a horizontal strip of wood or cardboard for fastening the individual score sheets thereto.

5. The apparatus of claim 4 wherein said horizontal channel includes pins for removably securing said strip of wood or cardboard.

6. A method for scoring duplicate bridge which comprises the following steps:
    (a) recording the scores of each hand on a plurality of identical non-folded score sheets having horizontal rows and vertical columns such that the final score appears in the right-most vertical column; and,
    (b) fastening said score sheets to a substantially flat, rectangular, and generally-vertically positioned score board in horizontally-aligned vertical overlapping relationship so as to expose only the right-most vertical column of each sheet by means of a staple gun slidably mounted on a horizontal support located along the vertically uppermost edge of said score board.

* * * *